March 5, 1963  J. R. KUENEMAN ETAL  3,080,126
BEARING SEALS FOR GYRATORY CRUSHERS
Filed Dec. 8, 1959  3 Sheets-Sheet 1
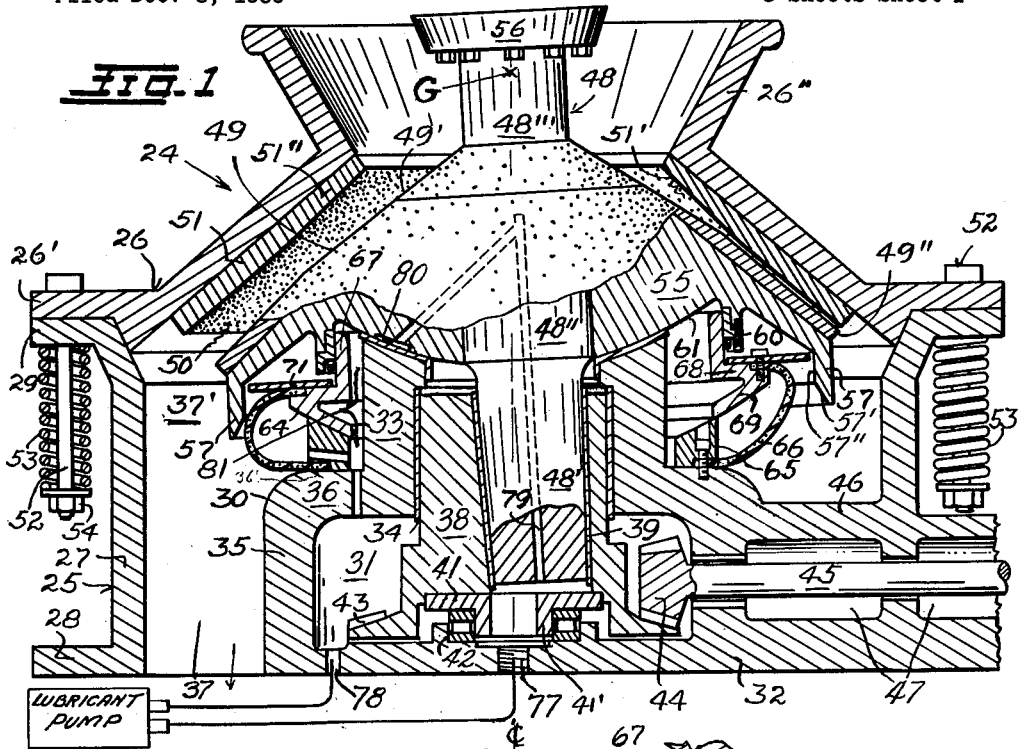
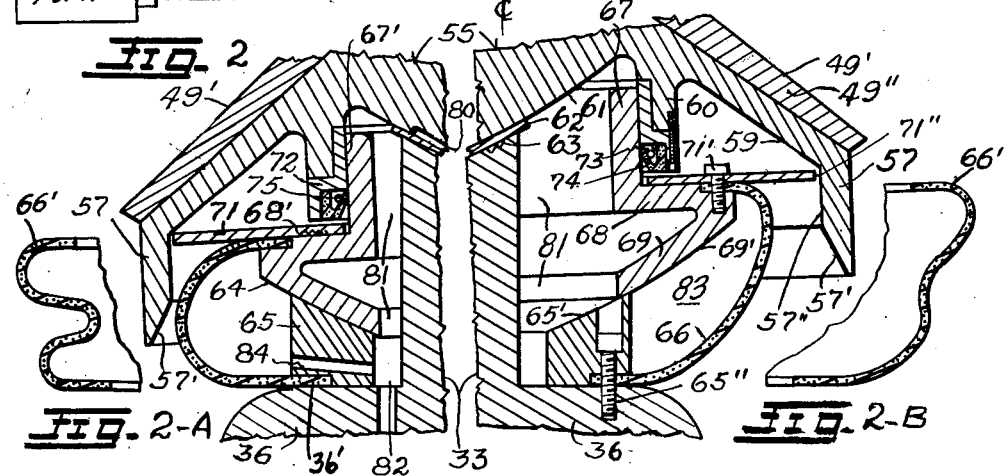
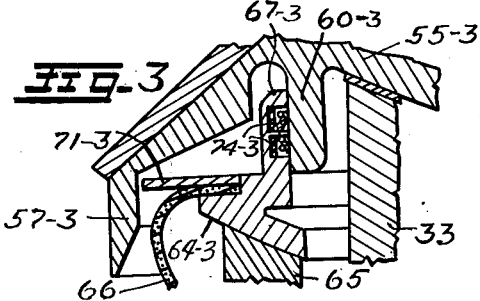
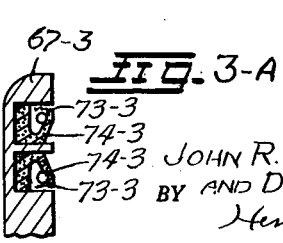
INVENTORS
JOHN R. KUENEMAN
AND DON KUENEMAN
BY Henry N. Young
ATTORNEY

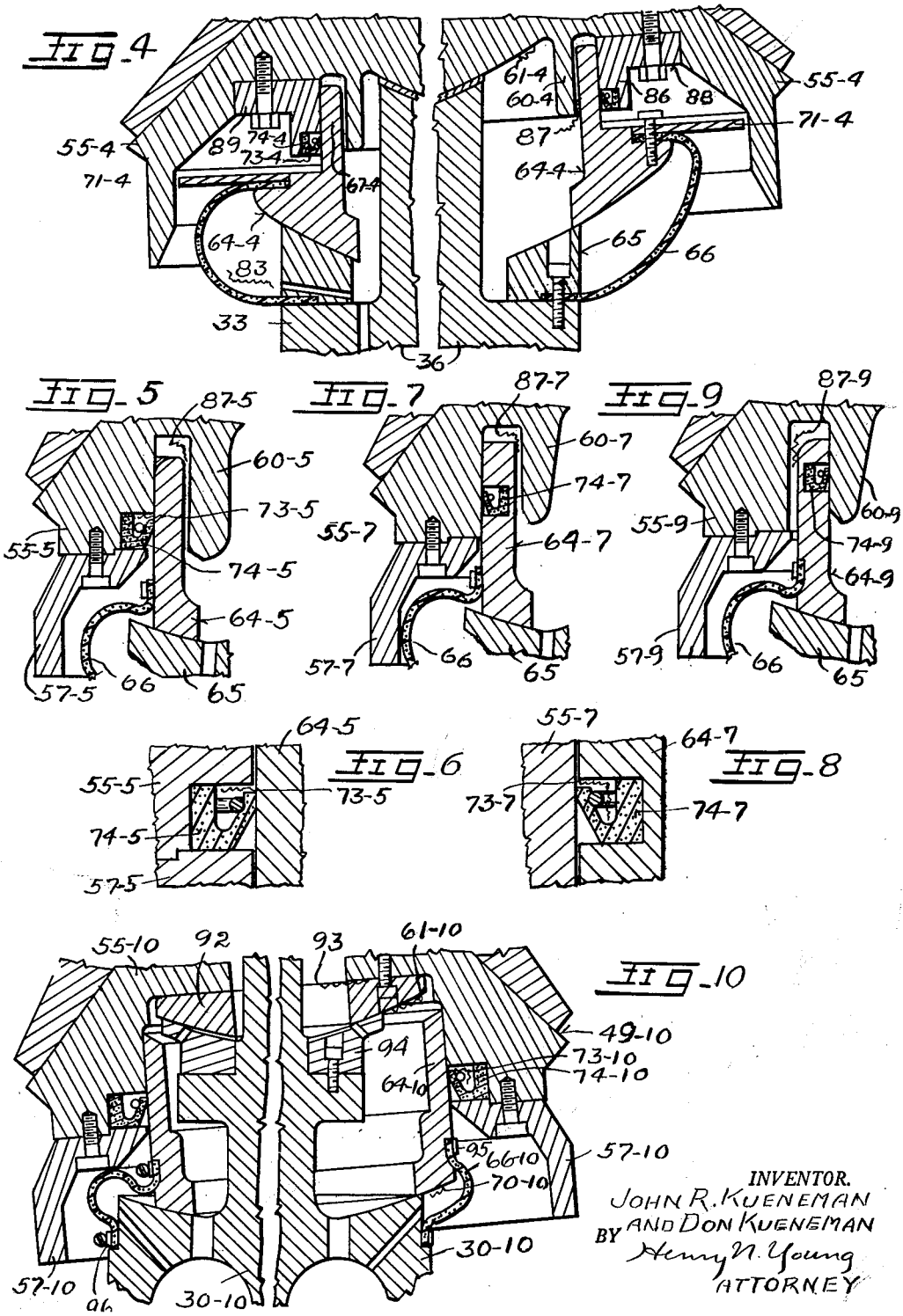

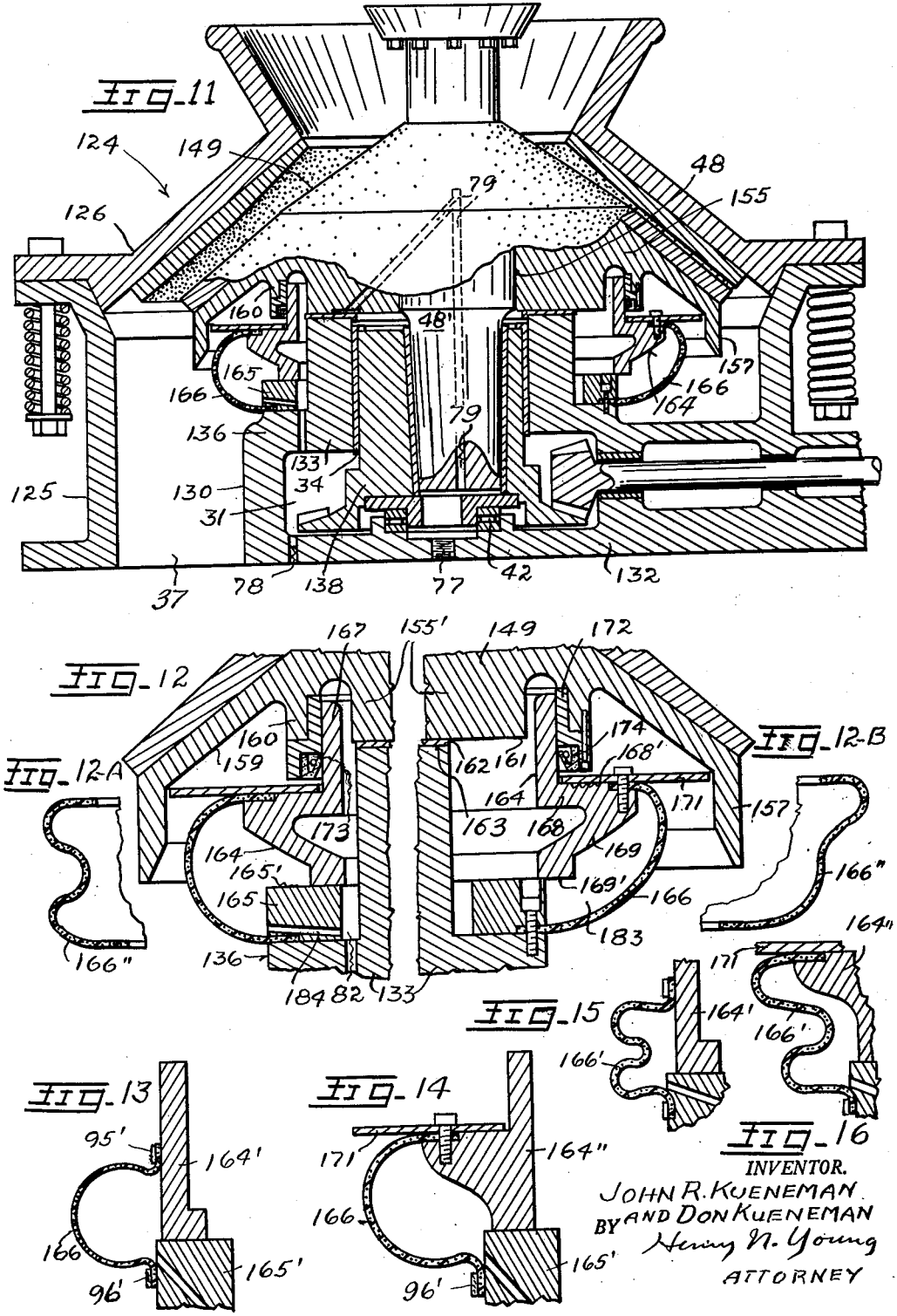

United States Patent Office 3,080,126
Patented Mar. 5, 1963

3,080,126
BEARING SEALS FOR GYRATORY CRUSHERS
John R. Kueneman, 5522 Carlton St., Oakland 18, Calif., and Don Kueneman, 6224 Estates Drive, Oakland 11, Calif.
Filed Dec. 8, 1959, Ser. No. 858,130
3 Claims. (Cl. 241—216)

The invention relates to a crusher of the gyratory type in which the material to be crushed is allowed to descend by gravity through and from a crushing zone of downwardly decreasing cross-section defined between a fixed upright conical concave and a conical head which is operative within the concave and is carried by a support-and-actuating structure providing for the working gyration of the head within the concave.

Understanding that the crushed material falling from the crushing zone defined between the opposed faces of the concave and head of a crusher of the present type is arranged to be discharged through a flow space provided about the necessarily lubricated support and positioning and drive means for the head, and that the delivered crushed product includes more or less dust which must be kept out of the bearings and lubricant of an aforesaid support structure while the seal of the lubrication system is maintained, the present invention particularly concerns the provision of an improved head-support structure having associated devices for protectively sealing-in all of the various bearings against dust penetration while sealing the lubricant in its circuit.

Accordingly, one object of the invention is to provide a crusher of the present operative type having the gyration-permitting support for the head operating directly at the head and substantially at the level of the discharge of material from the working zone of the crusher.

Another object is to provide a particularly simple and effective means for circulating and externally sealing-in the lubricant at all of the various bearings against an impregnation of the lubricant with dust including abradant fines created by the operation of the crusher.

A further object of the invention is to provide particularly simple support and positioning bearings for the head assembly and for all other movable crusher parts associated therewith.

An added object is to provide a particularly simple and effective drive means for the head.

The invention possesses other objects and features of advantage, some of which, with the foregoing, will be set forth or be apparent in the following description of typical embodiments thereof, and in the accompanying drawings, in which, FIGURE 1 is an upright axial section of a gyratory crusher disclosing one embodiment of the features of the present invention.

FIGURE 2 is an enlarged fragmentary and broken-away sectional elevation of a portion of the crusher of FIGURE 1 taken at the lubrication circuit and the seals thereof.

FIGURES 2-A and 2-B are fragmentary views illustrating different sectional forms which are assumable by a sealing sleeve of the structure of FIGURE 2.

FIGURE 3 is a fragmentary view showing a modification of an upper part of the dust seal disclosed in FIGURES 1 and 2.

FIGURE 3-A is an enlarged fragmentary section of a portion of a wiping dust seal of FIGURE 3.

FIGURE 4 is a view corresponding to that of FIGURE 2 and disclosing a second modification of the dust seal of FIGURES 1 and 2.

FIGURES 5, 7 and 9 are enlarged fragmentary sections showing alternative dust seal arrangements which are applicable to the general assembly of FIGURE 4.

FIGURES 6 and 8 are enlarged fragmentary views of wiping seal installations as respectively provided in the structures of FIGURES 5 and 7.

FIGURE 10 is a section similar to that of FIGURE 4 and discloses still another arrangement for providing seals for the head and stem of a gyratory crusher.

FIGURE 11 is a section corresponding to that of FIGURE 1 but shows certain of the lubrication and sealing features of interest as applied to a gyratory crusher in which the gyration of the head is effected without its swinging and solely laterally of the upright concave axis, in an arrangement which otherwise corresponds to that of FIGURES 1 and 2.

FIGURE 12 is an enlarged fragmentary and broken-away section of a portion of the showing of FIGURE 11 taken at the lubrication circuit parts and the bearing seals thereof.

FIGURES 12-A and 12-B are fragmentary views illustrating different sectional forms which are assumable by a sealing sleeve of the structure of FIGURE 12.

FIGURES 13 and 14 and 15 and 16 show alternative manners of associating a dust-sealing sleeve with the general structural combination of FIGURE 11.

As particularly illustrated in FIGURES 1 and 2, the features of present invention are embodied in a crusher structure 24 of the gyratory type comprising a generally cylindrical housing or frame having its axis upright and carrying the various cooperative members of the crusher including a fixed concave and an oscillatory working head, with said frame having a bottom or base section 25 removably mounting a coaxial top section 26 on an upright tubular exterior wall 27 provided with a radially extending securing flange 28 at its bottom and a radial flange 29 at its top for use in securing the overlying frame section 26 to it. An upstanding tubular wall 30 coaxially spaced within the wall 27 laterally bounds a cup-like base part providing a cavity 31 having its axis coincident with the axis of the wall 30 and extending from a bottom wall 32 provided by the base section 25; in the present structure, the frame parts 27 and 30 and 32 are integrally related whereby the section 25 may be of one-piece structure.

The tubular wall 30 is arranged to function as a support and guide collar for the crusher head and is intermediately stepped outwardly from a smaller upper portion 33 which interiorly mounts a bearing bushing 34 coaxial with the base section 25 and extends upwardly from a lower wall portion 35 of larger diameter which extends from the bottom wall 32 at the base of the wall portion 35 to a radial wall portion 36 connecting the upright wall portions 33 and 35 which are cooperative with the outer wall 27 of the frame section 25 to define an annular discharge passage 37 from the working zone of the crusher above it. As particularly shown, the bushing 34 of the upper portion 33 of the collar 30 provides a bearing which concentrically journals a sleeve 38 provided with a bearing bushing 39 in its bore and depending from within the journal thus provided to a suitable foot-bearing assembly which is operative between the lower sleeve end and the bottom socket wall 36 to support the sleeve for its journalled rotation within the bearing provided by the collar-carried bushing 34. As particularly shown, said sleeve-supporting foot bearing essentially comprises an annular base plate 41 coaxially socketed in the bottom end of the sleeve 38 and having an annular and concentric axial extension 41' depending from it at its central opening and fixedly engaged through the upper race ring of a bearing assembly 42 comprising bearing rollers engaged between the upper race ring and a lower race ring seated in the underlying wall 32 in centered relation thereto.

The sleeve 38 is arranged for its rotation by a suitable power means and fixedly provides a ring gear 43 at its bottom end for rotation in the larger lower portion of the cavity 31 defined within the collar 30 below the bushing 39, said gear 43 comprising a bevel gear which is in constant complementary engagement with a bevel pinion 44 carried by a shaft 45 which extends radially into the cavity 31 through a journalling shaft housing 46 provided by the base section 25. In the present structure, the shaft 45 extends from the outer end of the housing 46 through a suitable lubricant seal (not shown) provided at the outer housing end, whereby the shaft may be connected to a suitable means (not shown) for rotating it, while the shaft-housing space 47 comprises an extension of the cavity 31 which is arranged to function as a common sump for the lubricant utilized at and draining from the various drive-shaft and sleeve and head bearings.

By particular reference to the assembly of FIGURE 1, it will now be noted that the bearing bushing 39 in the bore of the sleeve member 38 rotatively receives the bottom portion 48' of a stem or spindle 48 which coaxially and removably carries an upwardly tapering frusto-conical working head 49 at an intermediate stem portion 48" in symmetrical relation to the stem for the coaction of the conical working face 49' of the head with the opposed upwardly-tapering interior working face 51' of a relatively fixed and overlying concave 51 provided by the upper frame section 26 and overlying an outer portion of the head face 49' to constantly define the working zone 50 of the crusher between said working faces while providing a material-feeding space at the bottom of a hopper provided by the frame section 26. As shown, the lower stem portion 48' is uniformly tapered toward its bottom end which is spaced above the sleeve-supporting foot-plate 41, and the head 49 is rotatively supported upon the collar 30 while the lower stem portion 48' is in laterally guided but unsupported relation to the bearing provided by the complementary bushing 39 in the sleeve member 38, whereby the head stem 48 is restrained for its movement with the rotating sleeve 38 in fixed angular and eccentric relation to the common upright central axis of the sleeve and crusher frame.

In the present crusher assembly, the axis of the fixed upright sleeve-journalling bearing 34 of the collar 30 and the axis of the stem-positioning bearing 39 of the sleeve 38 are angularly related and intersect at a fixed point G in the former axis and above the upwardly-tapering conical working face 49' of the head 49, whereby a rotation of the sleeve 38 is arranged to gyrate the head while oscillating it about said point G to provide the circumferentially variable working zone 50. As particularly shown, the mutually opposed working faces 49' and 51' of the head 49 and concave 51 are respectively provided by wear plates 49" and 51" which are replaceably and fixedly mounted on the head and concave in suitable manners not shown and define the downwardly contracted annular working zone 50 between them.

The present concave 51 comprises an intermediate part of the generally annular upper frame section 26 which integrally connects a bottom mounting flange 26' and an upper funicular hopper portion 26" respectively of said frame section, and the flange portion 26' is normally held fixedly seated upon the top face of the upper flange 29 of the frame base section 25. As shown, the opposed engaged faces of said flanges 26' and 29 are formed with inner portions which are angularly related to the horizontal plane of engagement of their outer portions to provide a mutually coaxial relation of the frame sections when the flange 26' is seated upon the flange 29. While the normally engaged flanges 26' and 29 might be positively fixed together, it is generally preferable that the flange 26' be yieldingly and resiliently held seated upon the flange 29, and to this end, bolts 52 depending through registering holes in the flanges carry compression springs 53 which are engaged between the under side of the flange 29 and nuts 54 on the bolts 52 for yieldingly holding the flange 26' seated upon the flange 29, whereby an overload object, as an unduly hard rock or a metal piece, engaged between the head and concave may temporarily unseat the section 26 to free an overload object from the working zone and so relieve any undue pressure produced by the object. It will, of course, be understood that the frame sections 25 and 26 may be adjustably related for effecting upright adjustments of the size of the crushing zone 50.

By particular reference to FIGURES 1 and 2, it will be noted that the stem-mounted head 49 comprises a tubular head block 55 of symmetrical frusto-conical outline which mounts the wear plate 49", and axially and complementarily receives thorugh its upwardly tapered bore the intermediate stem portion 48" which removably mounts the head block in wedgedly seated and normally retained releasable relation thereto. Also, the upper end portion 48''' of the stem 48 above the mounted block 55 removably carries a radially-extending capping member 56 at its upper extremity for distributing material being delivered to the hopper portion 26" of the frame section 26 while protecting the top end of the stem and providing a means for coaxially engaging the head for its support during its installation or removal.

At and around its peripheral bottom edge, the head block 55 includes a continuous tubular flange 57 depending integrally from the block adjacent the bottom line of the wear plate 49" whereby the outer face of the flange 57 is cooperative with the inner face of the frame base wall 27 to constantly define a continuous adit portion 37' of the frame-defined discharge passage 37 extending to the crushing zone 50. Preferably, and as shown, the flange 57 is beveled inwardly and upwardly from its lower outer edge to provide a conically concave face 57' directed toward the gyration point G and terminating at the bottom of a cylindrical inner flange face portion 57" above it. The continuous bottom edge of the flange 57 defines a plane perpendicular to the head axis and is constantly disposed sufficiently outside of the external cylinder of the lower portion 35 of the support collar 30 that the flange 57 functions as a protective apron opposite the said collar portion.

It will now be noted that the top of the underspace provided within the head block 55 between the upper portion of the lower stem section 48' and the flange 57, and above the plane of the bottom edge of said flange, is defined in part by a conically tapering convex continuous annular surface 59 extending upwardly from the upper end of the cylindrical inner face 57" of the flange 57 to the outer base line of a depending continuous annulus 60 of uniform cross-section and coaxial with the stem axis, and a spherically convex portion 61 having its center of curvature at the gyration point G for the head and extending inwardly from the base of the annulus 60 to the bottom of the stem-receiving bore of the head block. As particularly shown, the spherically convex underface portion 61 of the head is arranged to slidably seat upon a bearing surface provided by a suitable anti-friction bearing member 62 which is retainedly mounted on the support collar 30 at a complementary continuous seat 63 provided at and around the top of the upper portion 33 of the collar, the arrangement being essentially such that the crushing head 49 is supported from the collar 30 through the bearing member 62 for its gyration as the stem-positioning sleeve 30 is rotatively driven by the shaft 45.

Recalling that the depending peripheral head flange 57 defines the inner side of the upper portion of the flow passage 37 from the crushing zone 50 provided between the gyratory head 49 and the fixed concave 51, it will be understood that the crushed product falling from the crushing zone into the delivery passage outwardly of the flange 57 will be subjected to an appreciable degree of agitation by reason of the operation of the head, whereby wet or dry fines of the product might tend to move inwardly through and into the bearing 62 which constantly carries the head for its gyratory motion and must therefore be guarded against the inward passage of the fines into it and the outward escape of lubricant from the lubrication circuit of the crusher. Accordingly, and as disclosed in the embodiment of FIGURES 1 to 10 inclusive, constantly operating sealing and lubricant-retaining devices are provided for and outwardly of, the spherically concave support bearings in structures which function between the under side of the head block 55 outwardly of the head-supporting bearing and the exterior of a collar 30 which mounts the head-supporting bearing and journals the head-driving sleeve in which the head stem is journalled.

By particular reference to the arrangement of FIGURES 1 and 2, it will now be noted that a rigid one-piece ring element 64 is sealedly associated with the inner face of the depending annulus 60 of the head 49 in circumferentially sliding relation thereto, constantly and slidably rests upon an annular member 65 which is fixed to and upon the top face 36' of the intermediate horizontal portion 36 of the head-supporting collar 30, and is fixedly portion 36 by a torsionally yielding sleeve element 66 of a suitable flexible material, as "neoprene" or the like, which is impervious to dust and lubricant oil. It will be understood that the sleeve 66 inherently tends to assume and maintain a uniform and generally C-shaped cross-section circumferentially thereof, and is progressively distorted both circumferentially and axially thereof during and by reason of the gyration of the head 49, while the element 64 is held against rotation with the head as comprising a floating member with respect to the collar. As shown, the one-piece ring element 64 has a tubular upper part 67 having its uniform cylindrically convex outer face 67' opposite the inner face of the annulus 60 of the head block 55 and coaxial therewith, an intermediate part 68 extending radially from the bottom of the part 67 and having its upper face 68' perpendicular to the head axis, and a lower part 69 having an under face 69' extending obliquely downwardly and inwardly from the outer edge of the part 68 to a line which lies substantially in the downwardly-continued cylinder of the bore of the part 67.

As particularly shown, the upper face 65' of the annular support member 65 is spherically concave, with the center of its sphere at the gyration point G for the working head 49, and the under face 69' of the lower part 69 of the member 64 is spherically convex in complementary relation to the upper face 65' of the member 65, which latter member is fixed to and upon the support collar portion 36 in coaxial relation thereto as by screw bolts 65" securing it at spaced points around the collar portion 36. The arrangement is essentially such that the member 64 is constantly and solely carried upon the member 65 as the working head 49 is actuated with respect to the gyration point G by reason of the constantly seated engagement of the under face 69' of the member 64 upon the upper face 65' of the member 65 while the member 64 is maintained in coaxial and sealed relation to the head by reason of the axial and circumferential sliding engagement of the portion 67 of the member 64 with the annulus 60 of the head.

Recalling that the installed circumferentially continuous flexible sealing sleeve 66 has an inwardly facing general C-section which is variable therearound as the head is gyrated within the concave, the lower edge portion of this element is shown as fixed to and flat against the radial annular top face 36' of the portion 36 of the collar 30 in radial relation to the collar axis. The upper edge portion of the element 66 is fixed to and flat against a complementarily countersunk outer portion of the upper face 68' of the intermediate radial portion 68 of the member 64 in perpendicular relation to the head axis by means of a flat annular member 71 fixed against the face 68' of the portion, as by screw bolts 71', and sealedly clamping said sleeve edge to the portion 68 and having its peripheral edge 71" complementary to and closely adjacent the inner face portion 57" of the peripheral head flange 57. It will be understood that the described sealed mounting of the sleeve 66 on and between the portion 68 of the element 64 and the part 36 of the head-supporting collar 30 provides and maintains a lateral sealing-in of the described support bearing 62 for the floating element 64 and the sealing sleeve 66.

As particularly brought out in FIGURE 2, a sealing means is also provided for its constant functioning between the inner face of the depending annulus 60 of the head 49 and the outer face 67' of the portion 67 of the member 64, the present said means being of the "cup-leather" type to provide for both axial and circumferential relative movements of the faces 60' and 67' occasioned by the working gyration of the head with respect to the concave. As particularly shown, a generally Z-shaped business bushing member 72 is mounted on the inner face portion of the annulus 60 to define an annular cavity 73 opposite the outwardly-directed 67' of the portion 67 of the element 64 and extending upwardly from the bottom end of the member 72 which is slightly and constantly spaced from the inner edge portion of the member 71 carried on the upper portion 67 of the element 64. As indicated, a sealing ring 74 of generally V section has its outer side peripherally engaged in the cavity 73 and is arranged to have its upwardly directed inner side sealingly held against the opposed element face 67' by the action of a suitable tension spring 75 disposed in the ring groove and operative against the inward side of the ring 74, which primarily provides a seal against airborne material which has reached the portion of the under-head space outwardly of the annulus 60.

It will now be generally noted that the required lubrication of the various bearings and seals of the crusher is provided by parts of a lubrication circuit portion provided within the crusher structure and connecting an inlet opening 77 provided through the frame bottom wall 32 in coaxial relation to the bore 41' of the support plate 41 for the drive sleeve 39 with an outlet opening 78 provided in the wall 32 at the bottom of the collar space 31. Lubricant introduced under pressure through the opening 77 from a pump or other source and into the space beneath the sleeve-supporting plate 41 is arranged to flow, in part, into and through the bearings 42 for the plate 41 and so into the collar space 31 which is arranged to function as a lubricant sump.

Simultaneously, a part of the lubricant which is provided through the supply inlet 77 is delivered into the space between the plate 41 and the bottom end of the head stem 48 from which it is arranged to flow upwardly in part through a duct 79 extending axially through the stem from its bottom to a point above the level of the collar-carried support bearing 62 for the head and thence downwardly through the stem and block to a countersunk distributing recess 80 at the head-supporting bearing face 61. A major portion of the lubricant delivered to the recess 80 will escape downwardly along the bearing 62 into the portion of the underhead space defined above the top of the collar 30 for its delivery to the upright bearing provided at the bushing 34 which functions solely radially between the drive member sleeve 39 and the upper collar portion 33 and is arranged to drain downwardly upon the gear 43 in the space 31. Since the lower portion 48' of the head stem fits loosely in the bearing of the member 39 for positioning the stem without supporting the head thereat, some of the lubricant introduced immediately beneath the bottom end of the stem is arranged to flow upwardly through said bearing to the top of the sleeve and thence become part of the lubricant supplied to the bearing 34.

Lubricant escaping upwardly and outwardly from the head-supporting bearing 62 is arranged to flow into the variable space 81 defined between the outer wall of the upper collar portion 33 and the sleeve-connected elements 64 and 65, and below the overlying portion of the underhead face 61. A drain duct 82 provided through the collar portion 36 connects the bottom of said space 81 with the lubricant sump 31 provided beneath it. The flow of lubricant passing over the top of the upper portion 67 of the element 64 is stopped at the sealing ring 74 while lubricant carried into the space 83 defined between the flexible sleeve 66 and the outer face portions of the elements 64 and 65 may leave said space only by way of a radial duct 84 therefrom through the bottom part of the element 65 to the duct 82. In view of the foregoing, it will be understood that the variously described seals associated with the flow of the bearing lubricant of the present crusher are arranged to positively prevent the contamination of the lubricant with fines produced by the operation of the crusher and so insure a maintenance of the bearing surfaces in the best possible condition for the longest possible period of use.

It will now be noted that the present structure provides for a dismounting of the concave-providing upper frame section 26 by removing the securing bolts 52 and thereafter lifting the section off the supporting bearing 62 and out of the stem-positioning bearing 39, whereby the wear plates of the concave and the head may be readily made accessible for their replacement or repair while the parts of the lubricant seal assembly associated with the element 64 are made accessible. Since, however, a remounting lowering of the head requires that it reassume the particular relation to the element 64 in which the element is coaxial with the head, the annular member 71, which is mounted on the member 64 and has the center of its peripheral edge 71″ coaxial with the element 64, is utilized for providing the required cooperative relation of the element 64 to the head, the beveled face 57′ of the flange 57 of the head block 55 being arranged to engage the outer edge 71″ of the member 71 for guiding the member into the cylindrical upper bore portion of the flange for providing the required relation of the element 64 to the head.

While an unmounted continuous sealing sleeve 66 might be of C section radially thereof, it may assume the limiting distorted forms shown for it in FIGURES 1 and 2 at the diametrically opposite points of the working zone 50 of the crusher at which the zone is radially widest and narrowest. On the other hand, this sealing element of the present crusher assembly may initially have the circumferentially fluted, or "accordion," section of the sleeve 66′ which provides the limiting sectional forms shown for it in FIGURES 2–A and 2–B, or may have some other normal form which adapts it for its constantly fixed and torsionally flexible connection between the collar portion 30 and a "floating" member 64 or the like.

FIGURES 3 and 3–A disclose an alternative form of the floating seal-assembly element 64 of FIGURES 1 and 2 which comprises a rigid element 64–3 as operative between the top of a sealing sleeve 66 extending between the mounting ring 65 of the crusher frame and an annulus 60–3 depending within a head block 55–3 which otherwise generally corresponds to the head block 55 of the crusher structure of FIGURES 1 and 2. In the present sealing device, the upper portion 67–3 of the member 64–3 is sealedly related to the outer face of the annulus 60–3 and is provided with interior annular sockets 73–3 containing sealing rings 74–3 engaging the outer face of the annulus and corresponding to the rings 74 and having their sealing flanges oppositely directed with respect to the engaged opposed face of the portion 67–3 to cooperatively provide a two-way wiping seal against the downward entry of fines from the crushed product and the outward escape of lubricant from its circulation circuit as the working head is gyratively oscillated upon the head-engaging bearing provided by the base frame at the top of its support collar portion 33. Also, the radial intermediate portion of the element 64 mounts a radial re-positioning guide plate 71–3 for cooperation with the depending peripheral flange 57–3 of the head block 55–3 for use in remounting the removed head in the relation it had to the element 64–5 when the head was removed.

In the fragmentary showing of FIGURE 4, an operative installation of a sealing sleeve 66 is disclosed as associated with a head block 55–4 which provides a depending annulus 60–4 integral therewith and spaced outwardly from the spherically convex support bearing face 61–4 of the block and disposed opposite a flange 86 depending from the under side of the head outwardly of and opposite the annulus to define a downwardly-opening annular groove 87 between the annulus and said flange. The present flange 86 comprises part of a continuous ring member 88 of uniform angle cross-section having its other flange 89 extending outwardly of the flange 86 and dismountably fixed to and beneath the block 55–4, as by tap bolts. Also, the ring element 64–4 carried by the sleeve 66 has its upper tubular portion 67–4 normally extending into the groove 87 with its outer face in close opposition to the inner face of the flange 86, and said flange is preferably porvided adjacent its bottom edge with an inwardly-opening socket groove 73–4 in which a sealing ring 74–4 is engaged for constantly providing a wiping seal between the opposed faces of the annulus 60–4 and the flange 86 to provide and constantly maintain the desirable seal above the sleeve 66. As in the embodiment of FIGURES 1 and 2, the sleeve-carried element 64–4 is supported on the frame-carried support ring 65 which clampedly and sealedly secures the sleeve 66 to the frame portion 36, and the element 64–4 intermediately mounts a radial repositioning guide plate 71–4 for functioning in the manner previously described for the plate 71.

FIGURES 5 to 9 inclusive illustrate various installations of sleeve-carried elements 64–5 and 64–7 and 64–9 which functionally correspond to the element 64 but have relatively straight tubular forms, are arranged for their complementary seating upon the top face of a support ring 65, and have their upper portions disposed in downwardly opening annular grooves 87–5 and 87–7 and 87–9 which are respectively provided in head blocks 55–5 and 55–7 and 55–9 having their portions beyond the grooves providing peripheral depending aprons 57–5 and 57–7 and 57–9 comprising separate members attached to and beneath the head blocks outwardly of said grooves. In FIGURES 5 and 6, a sealing ring 74–5 is shown as mounted in an annular channel 73–5 defined by and between the head block and the top of the apron 57–5 adjacent the outer face of the groove 87–5 with its sealing lip directed upwardly. As shown in FIGURES 7 and 8, a sealing ring 74–7 is mounted in an annular exterior channel 73–7 of the portion of the member 64–7 disposed in the groove 87–7 and has the wiping lip of the sealing ring directed upwardly. FIGURE 9 shows a sealing ring 74–9 mounted in an annular interior channel of the part of the member 64–9 in the groove 87–9 and also has its sealing lip directed upwardly. In each of the arrangements of FIGURES 5 and 7 and 9, the grooves 87–5 and 87–7 and 87–9 have appropriately beveled bottom edges for aiding the guiding of the upper portion of the members 64–5 and 64–7 and 64–9 into the respective grooves 87–5 and 87–7 and 87–9.

By reference to the showing of FIGURE 10, it will be noted that an attached peripheral apron member 57–10 of a head block 55–10 defines the bottom of an annular channel 73–10 which receives a sealing ring 74–10 having its working edge directed upwardly and engaging the outer face of a ring member 64–10 corresponding to the member 64–5 of FIGURE 5. In this embodiment, the circular and spherically convex support face 61–10 of the head block is provided by a separate member 92 which is mounted on the block beneath a radial flat and coaxial under face portion 93 thereof and is seated upon the complementary top face of a separate ring member 94 mounted on the top of the support collar 30–10 of the frame. Also, the bottom end face 70–10 of the ring 64–10 is complementarily seated directly on the top of the support collar 30–10, while the tubular sealing sleeve 66–10 has its upper and lower end portions circumferentially and sealingly secured to and about the lower end of the ring 74–10 and to the top of the collar 30–10 respectively by suitable clamp bands 95 and 96 respectively.

Referring now to the operative and structural combination of FIGURES 11 to 15 inclusive, the lubricant and dust seal of our invention is disclosed as associated with a crusher structure 124 in which a working head 149 is mounted on a frame base section 125 which supports the head for its operative movement with respect to a cooperating concave and solely in a horizontal plane whereby the head is arranged for its working movement only in said plane while its axis remains vertical. The concave-mounting upper frame section 126 of this embodiment has the same form and features as the top frame section 26 of the embodiment of FIGURES 1 and 2, while the base section 125 differs from the base section 25 only in having the head-supporting portion 133 of the inner wall or collar 130 providing a flat annular support seat or face 163 for mounting the working head 149 on its top, all other base parts being numbered in the drawings as are the corresponding parts of the frame base section 25 of the first embodiment.

The head 149 of this embodiment is also provided with a positioning stem 48, and the head block 155 corresponds to the block 55 except for the form of its under face which is enclosed within a continuous depending peripheral flange 157 having its bottom edge defining a plane perpendicular to the head axis. The top of the underspace provided within the head block 155 and above the plane of the bottom edge of the flange 157 is defined in part by a conically tapered continuous annular surface 159 extending upwardly and inwardly from the upper end of the cylindrical inner face of the flange 157 to a continuous depending annulus 160. The annulus 160 defines the outer side of a downwardly opening annular groove which is bounded at its inner side by the exterior of a depending cylindrical block portion 155' having a flat annular bottom face 161 from which the head is fixedly supported on a flat bearing ring 162 provided on the upper face 163 of the support collar 133 of the frame base section 125 to provide for a solely lateral sliding movement of the supported head 149 upon the bearing 162 as the exteriorly cylindrical head-positioning sleeve member 138 is rotated about its axis and on its foot bearings 42 and within the fixed bore of the bottom frame portion 132 which journals it, it being noted that the sleeve bore in which the lower portion 48' of the head stem 48 is engaged is in parallel and eccentric relation to the sleeve axis to provide the present planar and solely lateral gyratory actuation of the head within the concave and about said axis.

It will now be noted that a rigid ring member 164 is attached to the top of a flexible sealing sleeve 166 of the general form shown and utilized in the previously-described embodiments, and has a tubular upper portion 167 extending into the head groove at the inner side of the annulus 160 in sealed relation to the opposed face of said annulus while a radial intermediate portion 168 of the member mounts a positioning ring 171 which is also utilized in clamping the upper edge of the sleeve 166 to the member 164 thereat. The lower edge of the sleeve 166 is clampedly fixed by a ring member 165 to a flat radial face provided at the top of the intermediate portion 136 of the collar 130 which has a flat annular upper face 165' with which the bottom edge face 169' of the lower portion 169 of the member 164 is slidably engageable to provide for a shifting of the member 164 with the head, whereby the member 164 is directly supported on the member 165 while being positioned by the sleeve 166, as is taught for the member 64 of the first embodiment. The upper portion 167 of the member 164 extends into the head groove defined inwardly of the annulus 160 and is sealedly engaged with the inner face of said annulus by a suitable sealing ring 174 which is carried within a suitable recess 173 provided at the bottom of a Z-shaped bushing member 172 carried by the annulus, the sealing device thus provided corresponding to that at the annulus 60 of the first embodiment.

As in the first embodiment, the required lubrication for the various bearings and seals of the present crusher is provided by a lubrication circuit portion through the appropriate crusher elements, with the lubricant circulated between the respective inlet and outlet openings 77 and 78 in the bottom 132 of the lower frame section 125. In the present arrangement, the sleeve 166 functions as a dust guard, as does the sleeve 66 of the first embodiment, and a duct 79 jointly provided by the stem 48 and the head block 155 is arranged to discharge lubricant received at the stem bottom to the flat support bearing 162 for the head at the top of the inner frame portion 133, and thence inwardly to the bearing bushing 34 and to the duct 82 by way of the open passage 181 defined between the floating ring 164 and the collar portion 133 and outwardly to the duct 184 leading from the space 183 enclosed by the sleeve 166, while the bearing bushings 39 for the stem and the foot bearing 42 are both pressure-lubricated, all as taught for the embodiment of FIGURES 1 and 2. Also, FIGURES 12–A and 12–B illustrate opposite side portions of a sealing sleeve 166' of the axially fluted type which is usable in place of the sleeve 166.

FIGURE 13 is a fragmentary section taken at a ring 164' of generally straight tubular conformation which operatively corresponds to the ring 64–10 of FIGURE 10, and is not arranged to carry a head-positioning ring 171. The present ring 164' is shown as sealedly connected to the up-turned upper edge portion of the sleeve 166 of channel section by a suitable clamp band 95' encircling said sleeve edge portion and the ring, while the down-turned lower edge portion of said sleeve is shown as sealedly clamped by a band 96' about the exterior of an annular frame-mounted element 165' which corresponds to the element 165 and provides the flat seat on which the ring 164' is slidably seated. FIGURE 14 is a fragmentary section at and adjacent a ring 164'' having the general exterior conformation of the ring 164 of FIGURES 11 and 12, but lacks the weight-reducing channel defined at the inner side of the ring 164 between its portions 168 and 169 thereof. The ring 164'' provides an annular upper face extending radially of its axis and against which a positioning ring 171 is secured for sealedly clamping the radially directed upper edge portion of the sleeve 166 between it and the intermediate ring portion, and the lower edge portion of the sealing sleeve 166 is sealedly clamped about the element 165' by a band 96' as in FIGURE 13. FIGURES 15 and 16 fragmentarily illustrate the use of an axially fluted sealing sleeve 166'' as respectively applied in the combinations of FIGURES 13 and 14.

It will now be noted that, in the present type of crusher, the gyration throw for gyrating a head defining a working zone between it and a cooperatively opposed concave may be anywhere from a non-contacting minimum up to four or more inches as determined by the effective eccentricity of the head axis, with the head and concave axes cooperatively defining a relatively small angle between them. In the embodiment of FIGURES 1 to 10 inclusive, said axes intersect at the gyration point G whereby the operating head 49 is both gyrated and oscillated with respect to the concave axis. In the embodiment of FIGURES 11 to 16, however, the axis of the head 149 remains parallel to the concave axis, whereby said operating head is only gyrated during its actuation within the concave and said non-intersecting axes may be referred to as defining a fixed angle of zero degrees.

In general reference to the provision and functioning of the generally tubular dust-seal assemblies which we have designed and disclosed for protecting the bearings of unitary assemblies which are arranged for their gyration about an upright axis for a useful purpose and are particularly exemplified as utilized for sealing-in the working heads of crushers of a gyratory type, it is important to note that each of the disclosed dust-seal installations advantageously includes the features of having its lower end sealedly anchored to the supporting frame for the gyrative assembly and having its upper end slidably and radially engaging cylindrical bearing surfaces of said assemblies in sealed relation thereto. Thus, each present sealing-in assembly so installed, and comprising a torsionally flexible sleeve terminally mounting a rigid annulus-carrying head-engaging sealing ring, while distortable as required by the gyratory movement of the head, is held from rotation with the head and is therefore not subjected to any measurable deleterious action of centrifugal force on its parts or on any lubricant contactingly enclosed by it, while wear and frictional effects remain at a minimum.

The present provision and use of a means for positively positioning the floating ring 64 or 164 at the head-engaging end of a present sealing sleeve 66 or 166 in accordance with the disposal of the eccentric stem-receiving guide bore of the driveable base-carried member 38 while the latter is static and as the positioning stem 48 of the head is being lowered through the sealing ring at its top for the ultimate supported disposal of the head on the frame, is also of particularly present importance, since it automatically insures a prompt and a correct mounting, or re-mounting, of a head-supporting stem with respect to the base without reference to the rotatively set position of the base-carried drive member with respect to its axis of rotation. Furthermore, and with particular reference to the stem-positioning rings 71 and 171, it will be noted that these elements, by reason of the proximity of their circular peripheries to the cylindrical guiding walls of a downwardly-opening receiving cavity of a gyratory head, alone provide a preliminary guard against the movement of larger particles and dust into the enclosed lubricated bearings.

By general reference to the form and disposition of the distortable sealing sleeves 66 and 166 of the embodiments of FIGURES 1 to 10 and 11 to 16 inclusive, it will be noted that the extreme outside portions of these elements constantly lie inwardly of the depending peripheral head flanges or aprons 57, 157, etc., and above the planes of the bottom flange edges, whereby said flanges serve to externally guard said sleeves from contact with the crushed product as it falls from the working zone 50 into the larger lower portion of the discharge passage 37 below the bulge of the sleeve and opposite the larger collar portions. Furthermore, by having the drainage ducts 84 and 184 extending from the bottoms of the spaces 83 and 183 enclosed between the sleeves and the head-supporting collars, a substantially constant drainage of said spaces is assured, and said sleeves are preferably so proportioned that a gravity drainage thereof through said ducts is assured for at least part, if not all, of each complete gyration of the head. It is also important to note that the present arrangement for providing lubrication to all bearings by a lubricant stream introduced under pressure through the inlet 77 and delivered to the space of the sump 31 by drainage from the various bearings and its discharge through the outlet 78 for its possible recirculation provides a particularly simple and effective common lubrication means entirely within the crusher structures.

From the foregoing description taken in connection with the accompanying drawings, the advantages of the present features of our invention will be readily understood by those skilled in the art to which the invention appertains. While we have shown and described operative arrangements which we now consider to comprise preferred embodiments of our invention, we desire to have it understood that the showings are primarily illustrative, and that such changes and developments may be made, when desired, as fall within the scope of the following claims.

We claim:

1. In a gyratory crusher having a conically tapered head portion and a positioning stem depending fixedly and coaxially from the head portion and providing an annular bearing face of and beneath the head and extending transversely of the stem coaxially thereof, a conically tapered concave receiving the head to define a downwardly contracting continuous working zone between the opposed conical faces of the head and concave, a support frame for the concave having an upstanding portion providing a bore complementarily receiving said stem for the gyration of its head and providing an annular bearing face at its top coaxial with said bore and complementary to said bearing face of the head to provide for a sliding gyratory seating of the head on said latter frame face, means carried by the frame cooperative with said element stem for effecting the gyration of said head portion of the element upon said supporting face of the frame, a liquid lubricant supply, means for circulating the liquid lubricant to and from the sealing and bearing faces of the crusher, a dust-sealing assembly including a rigid tubular element providing a cylindrical outer face coaxial with and in rotative and circumferentially sealed and axial sliding engagement with an opposed complementary head surface outwardly of said support-bearing face of the head and having a lower portion which slidably and sealedly engages an upwardly-directed annular bearing face of the frame outwardly of the stem-receiving frame portion for a gyratory movement of the element with the head, said dust-seal assembly further including a flexible dust-impervious sleeve sealedly and fixedly connecting the upper and lower portions of the sleeve to said tubular element and frame respectively and constantly spaced outwardly of said engaged and lubricated faces of the head and frame to define a space outwardly of the element for receiving lubricant escaping from the sealing and bearing faces of the element, means providing for the return of the received lubricant from the bottom of said sleeve-defined space to the lubricant supply, a depending peripheral flange of uniform circular cross-section provided by the head circumferentially thereof and extending about said stem in outwardly spaced coaxial relation to said head-mounted tubular element and having its inner face provided with an inwardly beveled bottom edge portion below a uniform bore portion therein, and an annular guide ring fixedly carried by the upper portion of said head-carried element in coaxial relation thereto and having a circular periphery coaxial with and closely and guidedly engageable with and within said inner flange face when the dust-seal assembly and the head are being mounted on the frame.

2. In a gyratory crusher having a conically tapered head portion and a positioning stem depending fixedly and coaxially from the head portion and providing an annular bearing face of and beneath the head and extending transversely of the stem coaxially thereof, a conically tapered concave receiving the head to define a downwardly contracting continuous working zone between the opposed conical faces of the head and concave, a support frame for the concave having an upstanding portion providing a bore complementarily receiving said stem for the gyration of its head and providing an annular bearing face at its top coaxial with said bore and complementary to said bearing face of the head to provide for a sliding gyratory seating of the head on said latter frame face, means carried by the frame cooperative with said element stem for effecting the gyration of said head portion of the element upon said supporting face of the frame, a liquid lubricant supply, means for circulating the liquid lubricant to and from the sealing and bearing faces of the crusher, a dust-sealing assembly including a rigid tubular element providing a cylindrical outer face coaxial with and in rotative and circumferentially sealed and axial sliding engagement with an opposed complementary head surface outwardly of said support-bearing face of the head and having a lower portion which slidably and sealedly engages an upwardly-directed annular bearing face of the frame outwardly of the stem-receiving frame portion for a gyratory movement of the element with the head, said dust-seal assembly further including a flexible dust-impervious sleeve sealedly and fixedly connecting the upper and lower portions of the sleeve to said tubular element and frame respectively and constantly spaced outwardly of said engaged and lubricated faces of the head and frame to define a space outwardly of the element for receiving lubricant escaping from the sealing and bearing faces of the element, and means providing for the return of the received lubricant from the bottom of said sleeve-defined space to the lubricant supply.

3. In a gyratory crusher having a conically tapered head portion and a positioning stem depending fixedly and coaxially from the head portion and providing an annular bearing face of and beneath the head and extending transversely of the stem coaxially thereof, a conically tapered concave receiving the head to define a downwardly contracting continuous working zone between the opposed conical faces of the head and concave, a support frame for the concave having an upstanding portion providing a bore complementarily receiving said stem for the gyration of its head and providing an annular bearing face at its top coaxial with said bore and complementary to said bearing face of the head to provide for a sliding gyratory seating of the head on said latter frame face, means carried by the frame cooperative with said element stem for effecting the gyration of said head portion of the element upon said supporting face of the frame, a rigid tubular element providing a cylindrical outer face coaxial with and in rotative and circumferentially sealed and axial sliding engagement with an opposed complementary head surface outwardly of said support-bearing face of the head and having a lower portion which slidably and sealedly engages an upwardly-directed annular bearing face of the frame outwardly of the stem-receiving frame portion for a gyratory movement of the element with the head, a depending peripheral flange of uniform circular cross-section provided by the head circumferentially thereof and extending about said stem in outwardly spaced coaxial relation to said head-mounted tubular element and having its inner face provided with an inwardly beveled bottom edge portion below a uniform bore portion therein, and an annular guide ring fixedly carried by the upper portion of said head-carried element in coaxial relation thereto and having a circular periphery coaxial with and closely and guidedly engageable with and within said inner flange face when the dust-seal assembly and the head are being mounted on the frame.

References Cited in the file of this patent
UNITED STATES PATENTS

| | | |
|---|---|---|
| 464,463 | McCully | Dec. 1, 1891 |
| 1,863,529 | Symons | June 14, 1932 |
| 2,134,876 | Hull | Nov. 1, 1938 |
| 2,148,682 | Campbell | Feb. 28, 1939 |
| 2,223,956 | Gruender | Dec. 3, 1940 |

FOREIGN PATENTS

| | | |
|---|---|---|
| 771,430 | Great Britain | Apr. 3, 1957 |